US007659997B2

(12) United States Patent
Hori

(10) Patent No.: US 7,659,997 B2
(45) Date of Patent: Feb. 9, 2010

(54) MOVING BODY SYSTEM AND METHOD OF DETECTING POSITION OF MOVING BODY

(75) Inventor: Kikuo Hori, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 0 days.

(21) Appl. No.: 11/945,621

(22) Filed: Nov. 27, 2007

(65) Prior Publication Data

US 2008/0123111 A1    May 29, 2008

(30) Foreign Application Priority Data

Nov. 28, 2006   (JP) .............................. 2006-320359

(51) Int. Cl.
  *G01B 11/14* (2006.01)
  *E01B 25/06* (2006.01)
  *G05D 1/10* (2006.01)
(52) U.S. Cl. ................ 356/620; 356/614; 356/394; 700/214; 318/568.12; 318/568.18
(58) Field of Classification Search ......... 356/614–615, 356/620, 394; 250/231.16, 231.18; 414/416.01, 414/373; 700/214, 258, 300; 318/568.12, 318/568.18
See application file for complete search history.

(56) References Cited

U.S. PATENT DOCUMENTS

| | | | | |
|---|---|---|---|---|
| 4,678,920 A | * | 7/1987 | Iadipaolo et al. ....... | 250/559.05 |
| 6,535,621 B1 | * | 3/2003 | Fujita ...................... | 382/112 |
| 6,909,516 B1 | * | 6/2005 | Hoover .................... | 356/615 |
| 6,987,465 B2 | * | 1/2006 | Mittmann ................ | 341/15 |
| 7,034,283 B2 | * | 4/2006 | Williams et al. ....... | 250/231.16 |
| 7,221,443 B2 | * | 5/2007 | Akiyama ................ | 356/237.1 |
| 7,408,314 B2 | * | 8/2008 | Hayashi ................. | 318/568.12 |
| 7,426,424 B2 | * | 9/2008 | Moriguchi .............. | 700/214 |
| 7,428,049 B2 | * | 9/2008 | Shimoda ................ | 356/364 |
| 2004/0109746 A1 | * | 6/2004 | Suzuki ................... | 414/373 |

FOREIGN PATENT DOCUMENTS

| JP | 51-46925 | 12/1976 |
|---|---|---|
| JP | 53-48471 | 11/1978 |
| JP | 11-155990 A | 6/1999 |
| JP | 2005-091020 A | 4/2005 |
| JP | 2007-10534 A | 1/2007 |

OTHER PUBLICATIONS

Japanese Office Action dated Aug. 4, 2008, issued in corresponding Japanese Patent Application No. 2006-320359.

* cited by examiner

*Primary Examiner*—Sang Nguyen
(74) *Attorney, Agent, or Firm*—Westerman, Hattori, Daniels & Adrian, LLP.

(57) ABSTRACT

Linear sensors are provided in two rows along a moving route of a moving body. A relative position of a magnet provided in the moving body relative to the linear sensor is determined, and an origin coordinate of the linear sensor is added to the determined relative position to determine an absolute position of the moving body.

3 Claims, 6 Drawing Sheets

MOVING BODY SYSTEM AND METHOD OF DETECTING POSITION OF MOVING BODY

TECHNICAL FIELD

The present invention relates to a moving body system. In particular, the present invention relates to a system which makes it possible to rapidly detect an absolute position of a moving body on the ground side with a high degree of accuracy.

BACKGROUND ART

The inventor studied about a technique of rapidly recognizing an absolute position of a moving body such as a stacker crane, a rail guided vehicle, or an overhead traveling vehicle with a high degree of accuracy on the ground side. If this is achieved, it is possible to easily implement running control and stop control of the moving body, and avoid collision and jamming. For this purpose, it is necessary to detect the position of the moving body along a moving route continuously without any interruption, or almost continuously. Further, since each linear sensor outputs a relative coordinate relative to the origin of the linear sensor, the relative coordinate needs to be converted into an absolute position. Patent Publication 1 (Japanese Patent Application No. 2006-218694) discloses a technique of detecting a position of a moving body using linear sensors.

DISCLOSURE OF THE INVENTION

Problems to be Solved by the Invention

An object of the present invention is to make it possible to rapidly determine an absolute position of a moving body on the ground side with a high degree of accuracy.

Another object of the present invention is to distinguish a plurality of moving bodies to determine respective absolute positions of the moving bodies.

Still another object of the present invention is to prevent interruption in detecting a position of a moving body at a boundary between detection areas of linear sensors.

Means for Solving the Problems

According to the present invention, a moving body system for detecting a position of a moving body by liner sensors is provided, and the system includes:

the linear sensors each outputting a relative position based on an origin of each sensor, the linear sensors being arranged at least in two rows along a moving route of the moving body;

at least two marks detected by the linear sensors, the marks being provided in the moving body; and means for adding an absolute coordinate of the origin of each sensor to the output from the linear sensor to determine an absolute position of the moving body.

According to the present invention, a method of detecting a position of a moving body is provided, and the method includes the steps of:

arranging a plurality of linear sensors each outputting a relative position based on an origin of each sensor, at least in two rows along a moving route of the moving body;

providing at least two marks detected by the linear sensors in the moving body; and adding an absolute coordinate of the origin of each sensor to the output from the linear sensor to determine an absolute position of the moving body.

Preferably, the moving body system further includes means for storing data of an ID of the moving body and a current position of the moving body, and means for retrieving a record of the moving body having the current position closest to the output from the linear sensor, from data stored in the storing means, and updating the current position based on the output from the linear sensor.

Further, preferably, detection areas of the linear sensors in at least two rows are overlapped with each other at a boundary between the detection areas.

Advantages of the Invention

In the present invention, the linear sensors are arranged in at least two rows, and at least two marks of the moving body are detected alternately. Therefore, it is possible to detect the position of the moving body without any interruption. Each of the linear sensors outputs a relative coordinate of the linear sensor. By adding an absolute coordinate of the origin of the linear sensor to the relative coordinate, it is possible to determine the absolute position of the moving body. In this manner, in the present invention, it is possible to rapidly determine the absolute position of the moving body with a high degree of accuracy.

In the case where data of an ID of the moving body and a current position of the moving body are stored, a record of the moving body having the current position closest to the output from the linear sensor is retrieved from data stored in the storing means, and the current position is updated based on the output from the linear sensor, even if a plurality of moving bodies are present, it is possible to detect respective absolute positions of the moving bodies. Thus, without requiring ID readers for the moving bodies, it is possible to track moving conditions of the plurality of moving bodies.

Further, in the case where detection areas of the linear sensors in at least two rows are overlapped with each other at a boundary between the detection areas, the marks of the moving body can be detected in any of the linear sensors at the boundary between the detection areas. Thus, it is possible to detect the absolute position of the moving body without any interruption.

DESCRIPTION OF THE NUMERALS

Figure 1:
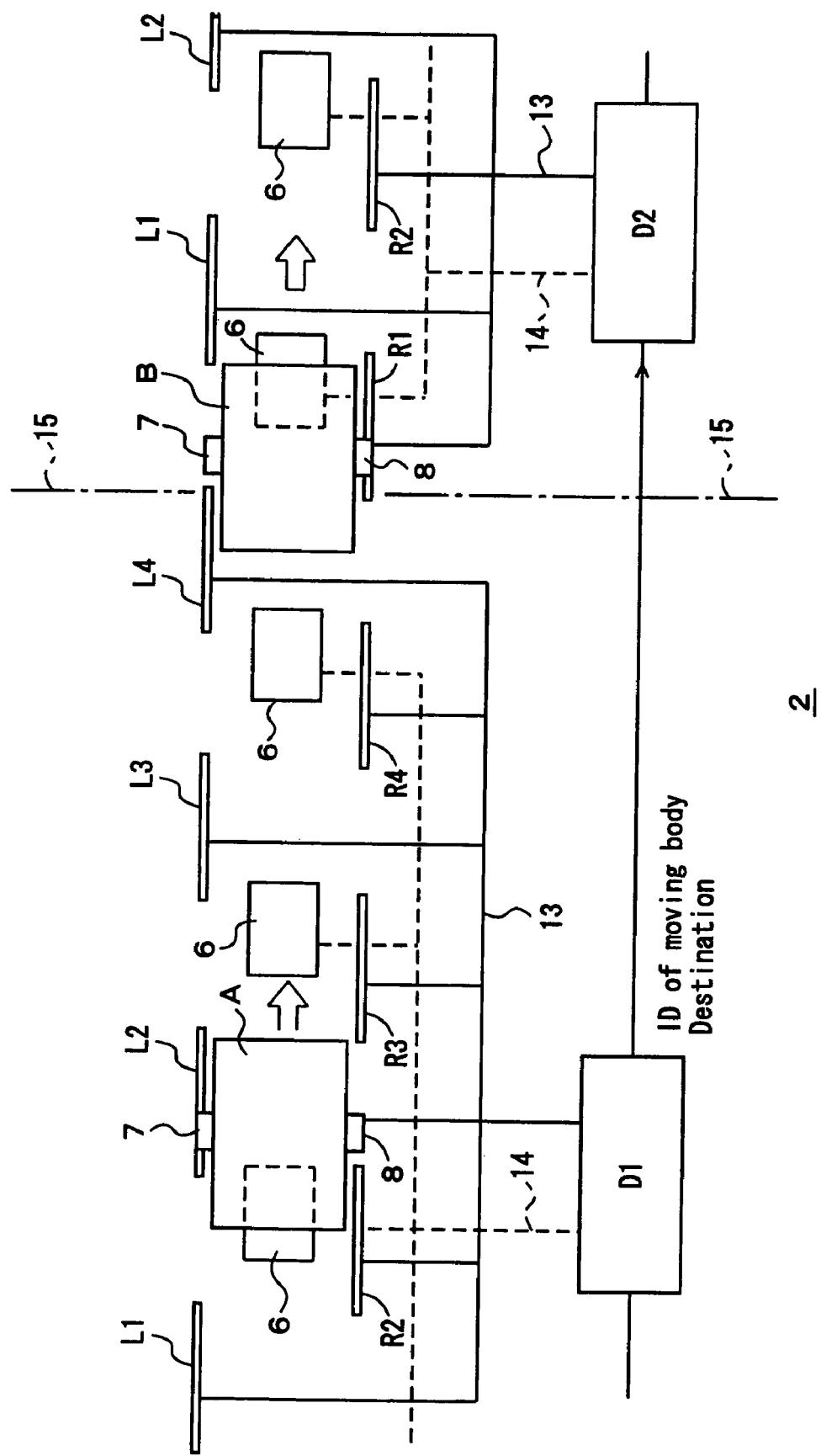
FIG. 1 is a block diagram showing a moving body system according to an embodiment.

2: moving body system
6: linear motor
7, 8: magnet
13: sensor network
14: control network
15: local area boundary
20: alternative current source
21: coil 22: phase detection circuit
23, 24: calculation circuit
26: offset table
27: tracking table
28: blocking management unit
A-C: moving body
D1-D2: local controller
R1-R4: linear sensor
L1-L4: linear sensor

EMBODIMENT

FIGS. 1 to 6 show a moving body system 2 according to an embodiment. Although the embodiment will be described in connection with a case of a transportation vehicle system in which a primary side on ground type linear motor is used, the present invention is not limited in this respect. Other transportation vehicles such as a stacker crane, a rail guided vehicle, and an overhead traveling vehicle may be controlled. Further, the present invention is applicable to control of a moving body other than the vehicle, such as control of an elevator. In the drawings, reference numerals 6 denote linear motors provided on the ground. Each of moving bodies A and B has at least two magnets 7, 8 as marks on both of the left and right sides. Reference numerals D1 to D3 denote local controllers, and reference numerals R1 to R4 denote linear sensors provided, e.g., on the right side of a moving direction of the moving bodies A to C. Likewise, linear sensors L1 to L4 are arranged in one row on the left side of the moving direction of the moving bodies A to C.

In the embodiment, the linear sensors R1 to R4 and L1 to L4 are arranged on the left and right sides of the moving route of the moving bodies A to C, in two rows in total. Alternatively, the linear sensors may be arranged in two rows on one of the left and right sides. Alternatively, the linear sensors may be arranged in two rows on the left side, and in two rows on the right side, i.e., in four rows in total. In the drawings, the linear sensors R1 to R4 and L1 to L4 represent detection areas. The detection areas of the linear sensors in the row on the left side and the detection areas of the linear sensors in the row on the right side are partially overlapped with each other. Thus, it is possible to continuously detect the positions of the moving bodies A to C without any interruption at the boundaries between the detection areas.

Reference numerals 13 denote sensor networks for outputting signals from a plurality of linear sensors to local controllers D1 to D3. Reference numerals 14 denote control networks for outputting control signals from the local controllers D1 to D3 to the linear motors 6. Reference numerals 15 denote a local area boundary between control areas of the respective local controllers. Preferably, the local area boundary 15 is positioned near the boundary between the detection areas of the linear sensors.

Figure 2:
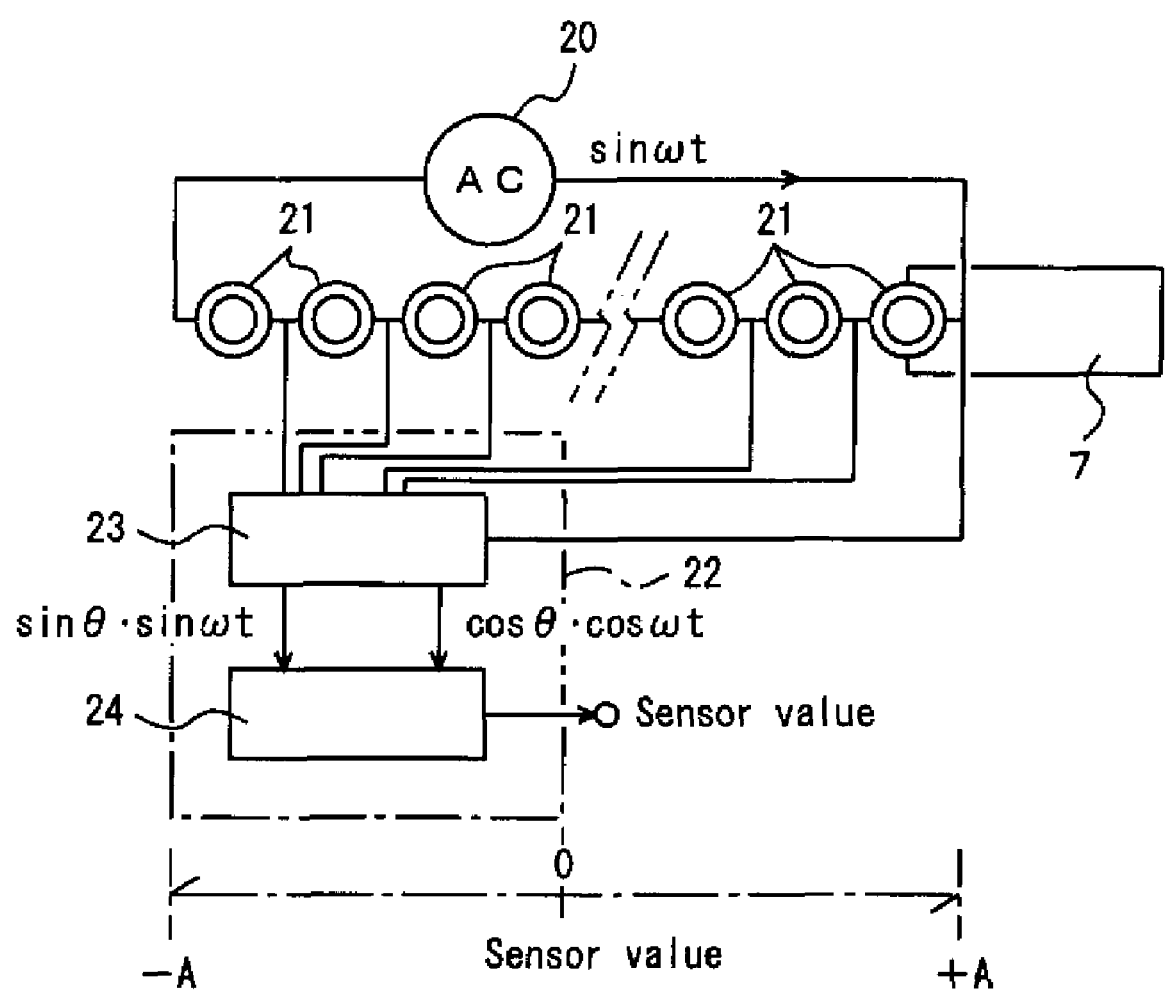
FIG. 2 is a block diagram showing a liner sensor and a magnet according to the embodiment.

FIG. 2 shows structure of the linear sensor. A reference numeral 20 denotes an alternative current source for supplying detection current to a plurality of coils 21. For example, the phase of the current is $\sin \omega t$. A reference numeral 22 denotes a phase detection circuit. Reference numerals 23 and 24 denote calculation circuits. For example, data such as terminal voltage of each coil is inputted to the calculation circuit 23 to determine $\sin \theta \cdot \sin \omega t$, $\cos \theta \cdot \cos \omega t$, or the like. Here, $\theta$ is a phase in the case where the detection area of the linear sensor is $2\pi$. By magnetic coupling between the magnet and the coil, the inductance of the coil changes. Thus, depending on the position of the magnet relative to the detection area, the phase $\theta$ changes. Assuming that the length of the detection area of the linear sensor is 2A, the sensor value of the linear sensor becomes "0", for example, at the center of the detection area. The sensor value is positive (+) on one side, and negative (−) on the other side of the detection area. Although combination of the linear sensor and the magnet has been described, the mark is not limited to the magnet. An arbitrary magnetic body may be used as the mark. Further, types of the linear sensor and the mark can be selected arbitrarily.

Figure 3:
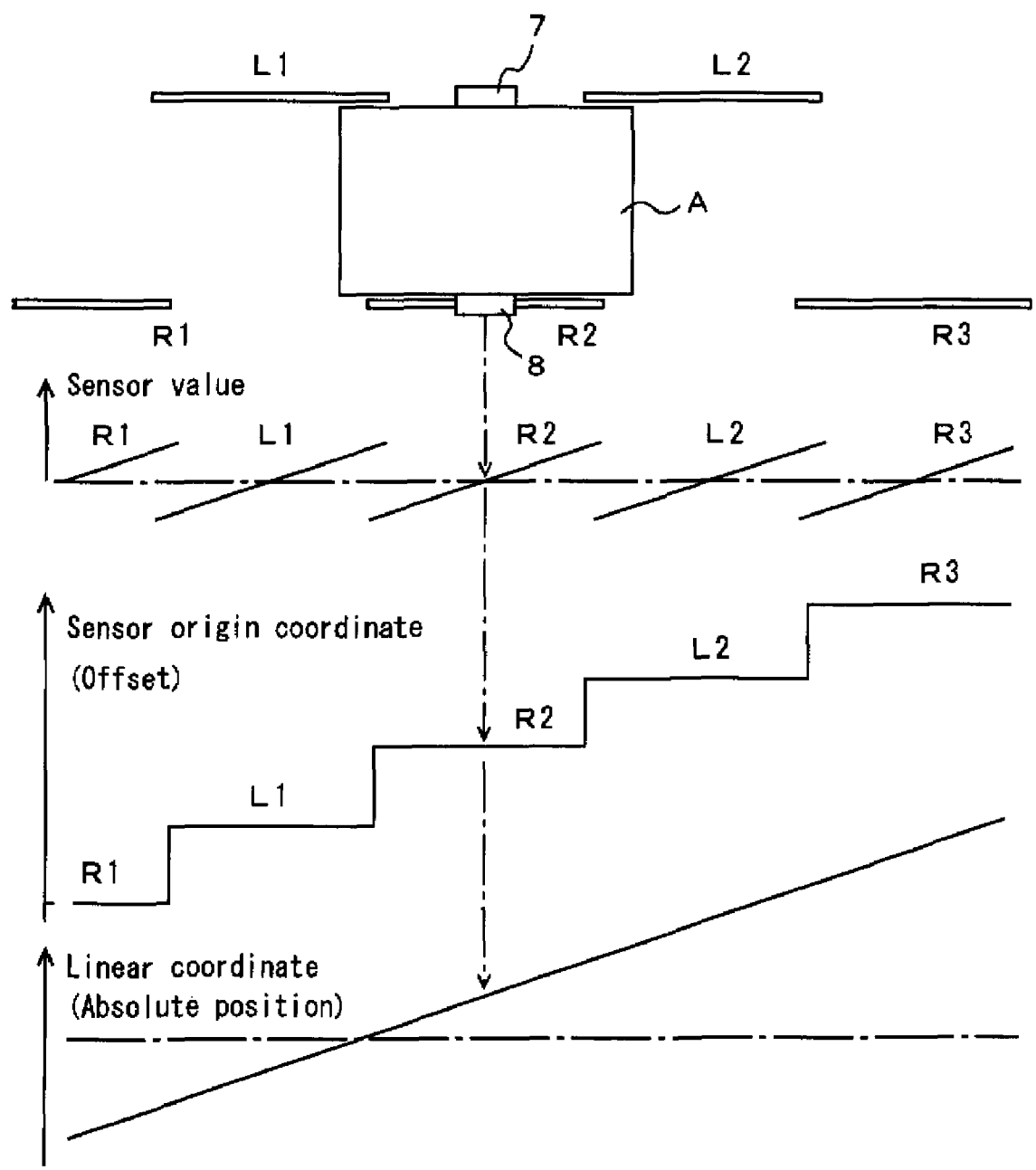
FIG. 3 is a graph showing conversion from sensor values to linear coordinates according to the embodiment.

FIG. 3 shows conversion from sensor values to linear coordinates (absolute positions) of individual linear sensors, taking the moving body A as an example. Each of the linear sensors outputs its relative position relative to the origin as a sensor value. The origin coordinate of each linear sensor is stored as an offset. By adding the offset to the sensor value, it is possible to determine a linear coordinate of the moving body relative to the origin, i.e., an absolute position of the moving body. The moving direction of the moving body can be determined based on the increase or decrease in the sensor value of the linear sensor. At the time of starting operation, the moving body stores an ID of the linear sensor which is being used for detection. Each time the linear sensor is switched to another linear sensor, in accordance with the moving direction of the moving body, it is determined whether the next linear sensor in the moving direction is used for detection, or the previous linear sensor in the moving direction is used for detection. In this manner, it is possible to determine the ID of the linear sensor used for detection, and the ID is written in a tracking table as described later.

Figure 4:
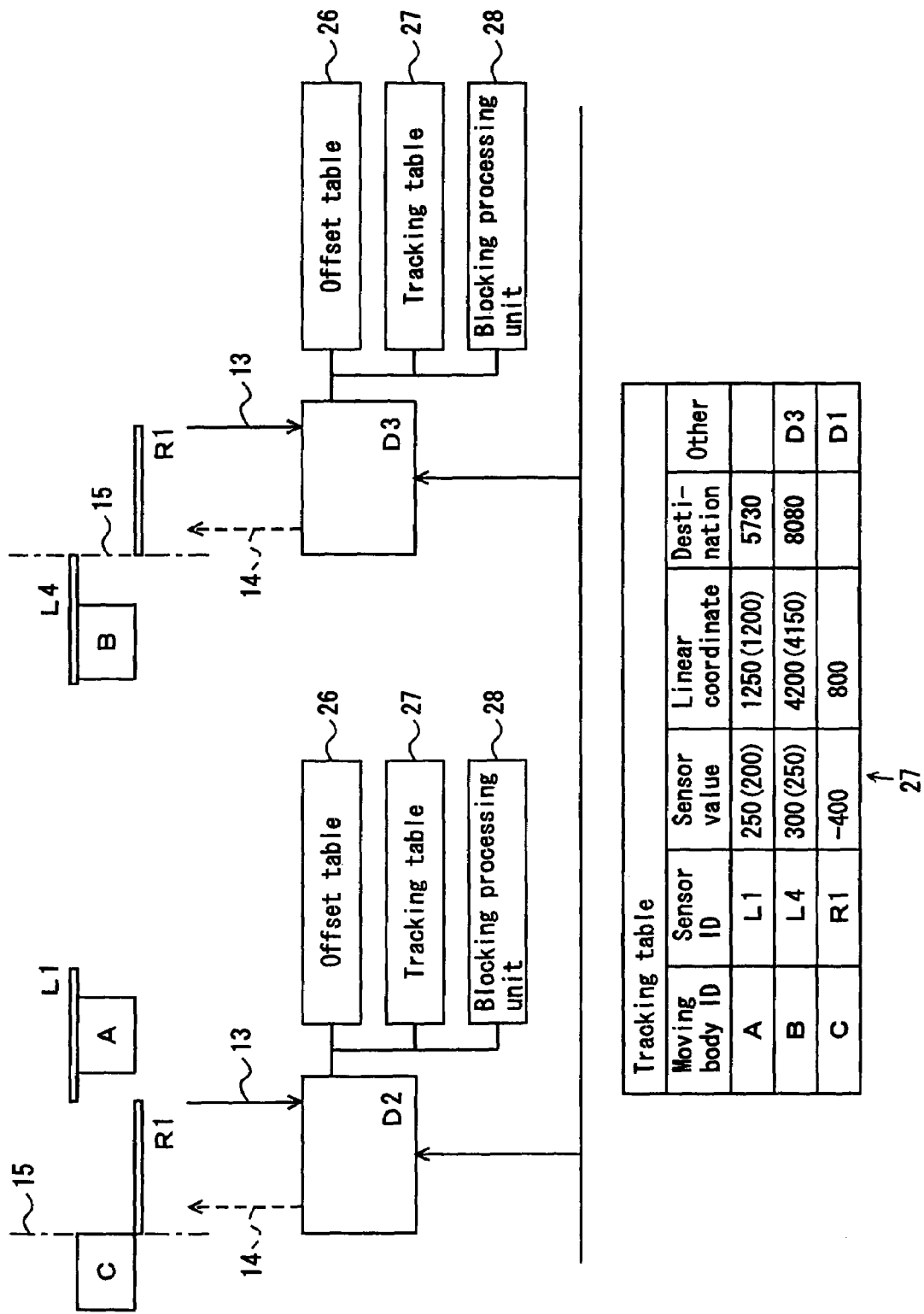
FIG. 4 is a block diagram showing local controllers according to the embodiment.

FIG. 4 shows structure of the local controllers. Offset tables 26 store offsets of linear sensors managed by the individual controllers. A tracking table 27 stores IDs of moving bodies managed by the individual local controllers, numbers (sensor IDs) of linear sensors which are used currently, sensor values of the individual linear sensors relative to their origins, linear coordinates (absolute position) converted from the sensor values using the offsets, destinations of the moving bodies, and other data.

Each time a new sensor value is obtained from the linear sensor, a record closest to the new sensor value is retrieved from the tracking table, and the sensor value and the linear coordinate are updated based on the newly inputted sensor value. For example, in FIG. 4, two moving bodies A, B are managed by the local controller D2. The previous linear coordinate of the moving body A is 1200, and the previous linear coordinate of the moving body B is 4150. When a sensor value corresponding to 1250 of the linear coordinate is inputted, the value is used as a new linear coordinate of the moving body A. Likewise, when a linear coordinate 4200 is inputted, the value is used as data of the moving body B. In this manner, it is possible to track the positions of the individual moving bodies.

The other field of the tracking table stores data for managing incoming moving bodies and outgoing moving bodies between the local controllers. For example, in the case where the moving body C moves from the local controller D1 on the upstream side to the local controller D2, the local controller D1 notifies information about movement of the moving body C to the local controller D2. The local controller D2 stores the most upstream sensor value of the most upstream sensor R1, e.g., −400, as a provisional position of the moving body C. When the linear sensor R1 actually detects a moving body, the record of the moving body C is updated. The moving body B is going to move out from the control area of the local controller D2, and the information has been notified to the local controller D3 on the downstream side.

In the case where the moving route includes branches, in order to recognize which local controller will control the moving body next, or in order to avoid jamming or avoid collision of movable bodies, it is preferable that the destination and the scheduled moving route are stored in the tracking table 27 or the like. In the case where a new moving body appears in the control area of the local controller, in preparation for the case where a plurality of local controllers are present on the upstream of the merge point, the tracking table stores data indicating which local controller on the upstream side should be notified. For example, the data is an ID of the local controller which has notified the entry of the moving body. It should be noted that data of the entire moving route from the starting point to the destination may be stored in the tracking table.

Figure 5:
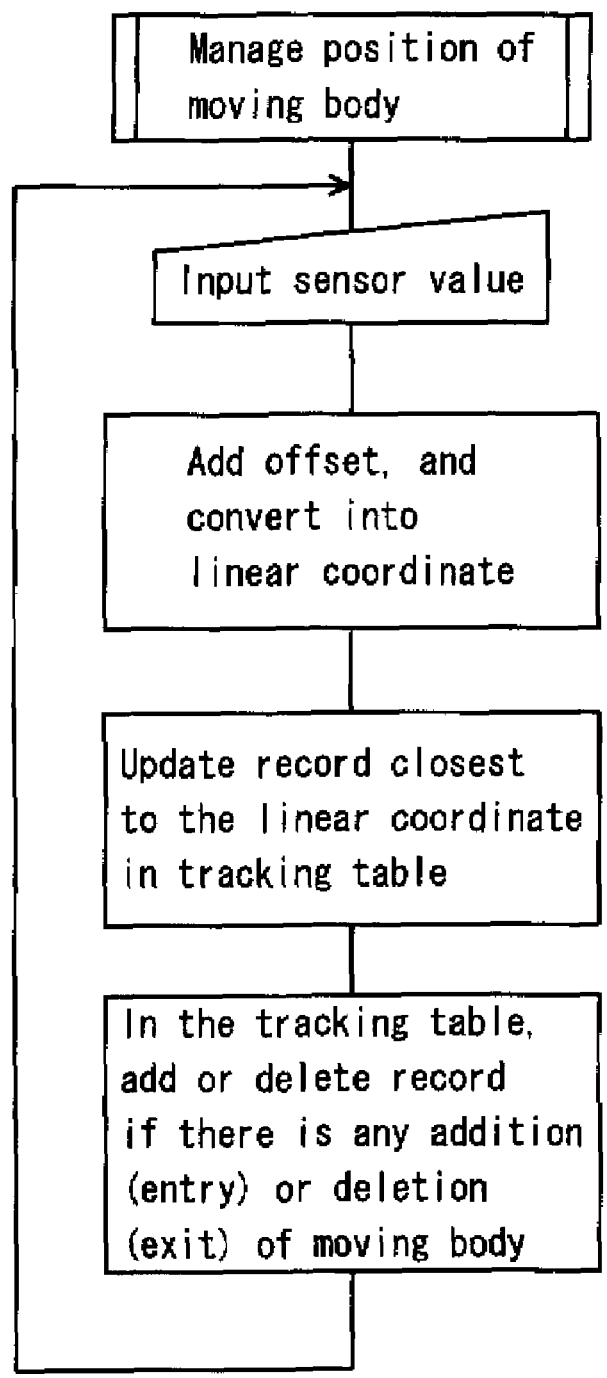
FIG. 5 is a flow chart showing an algorithm of managing a position of a moving body according to the embodiment.

FIG. 5 shows an algorithm of managing a position of the moving body. When a sensor value is inputted to a local controller, an offset is added to the sensor value for conversion into a linear coordinate. In the tracking table, a record closest to the linear coordinate is updated. It should be noted that addition of the offset may be carried out individually by each linear sensor. However, in the case where addition of the offset is carried out by the local controller, since it is not necessary to write inherent data in the linear sensor itself, the linear sensor can be installed or exchanged easily. Instead of searching a record closest to the linear coordinate in the tracking table, a record closest to the sensor ID and the sensor value may be searched. When the moving body passes the local area boundary between the local controllers, a record for each moving body is added (in the case where the moving body enters the control area) or deleted (in the case where the moving body has moved out of the control area). The local controller on the upstream side notifies an ID and a destination of the moving body which will enter the control area next.

Figure 6:
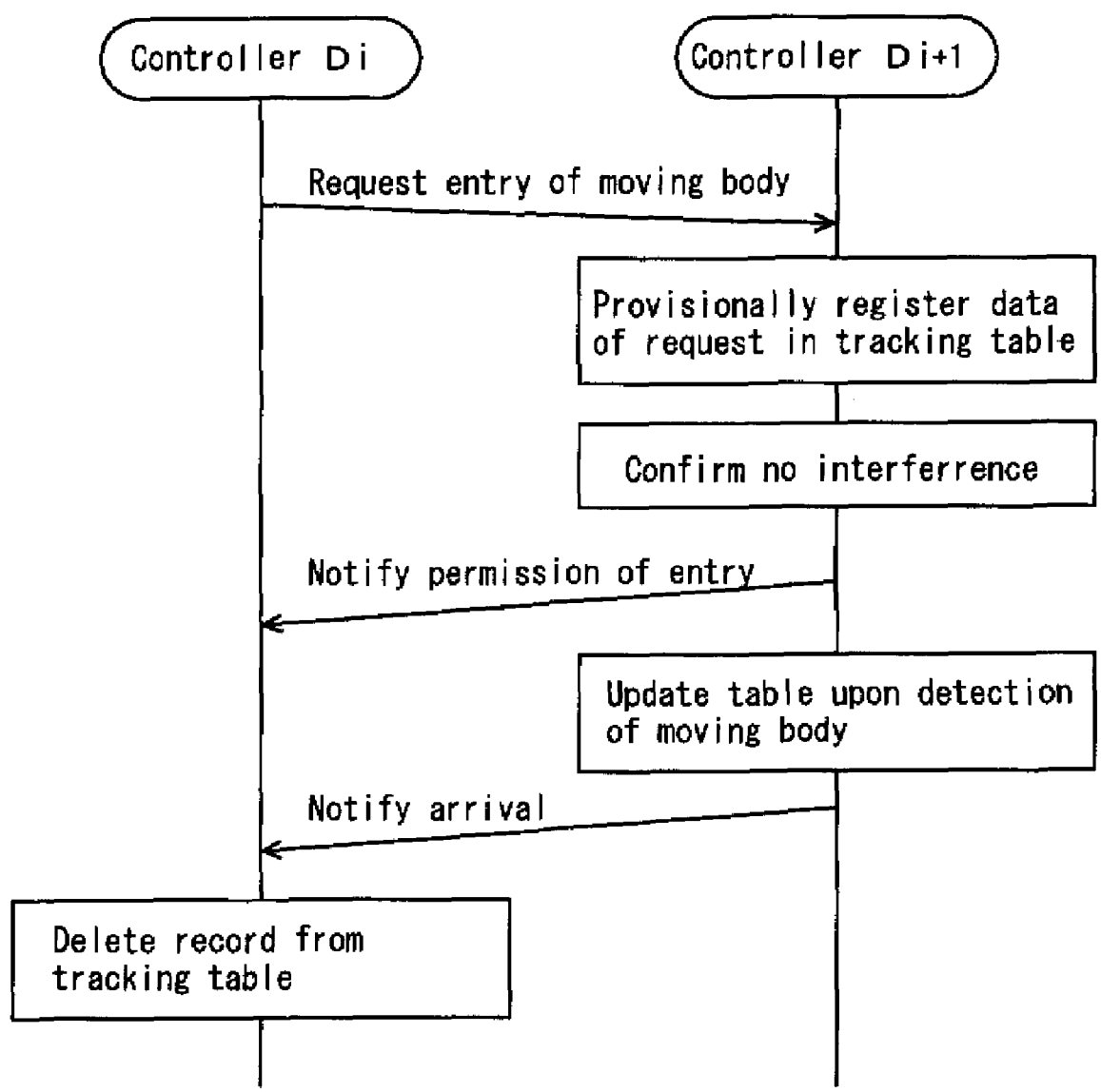
FIG. 6 is a diagram showing interaction between local controllers according to the embodiment.

FIG. 6 shows interaction between controllers. The upstream controller is shown on the left side, and the downstream controller is shown on the right side. In the case where the moving body enters the control area of the downstream local controller, the upstream local controller makes an entry request to this effect, and data of the request includes an ID and a destination point of the moving body. In response, the downstream local controller generates a provisional record assuming that the moving body which is scheduled to enter the control area is positioned at the upstream end in the control area of the most upstream linear sensor. Next, based on the position of the provisional record, it is confirmed that there is no interference from other moving bodies, and permission for the entry is notified to the upstream local controller. Thus, the upstream local controller allows the moving body to pass through the local area boundary. When the moving body is detected by the linear sensor of the downstream local controller, the tracking table is updated, and notification indicating the arrival of the moving body is outputted to the upstream local controller. In response to the notification, the upstream local controller deletes the corresponding record from the tracking table.

In the embodiment, the record having the current position closest to the sensor value is updated. Alternatively, an ID reader may be provided along the moving route to read IDs of moving bodies. However, in this case, cost of installing the ID reader is required.

The moving direction of the moving body is not limited in a horizontal plane. For example, the moving body moves in a vertical plane like an elevator.

In the embodiment, it is possible to detect the absolute position of the moving body continuously along the entire length of the moving route of the moving body without any interruption. However, detection may be partially interrupted in areas where it is difficult to install the linear sensor. Further, the moving body may not move linearly, and may rotate like a turntable.

In the embodiment, the following advantages are obtained.
(1) It is possible to easily convert a sensor value of each linear sensor into an absolute position.
(2) It is possible to rapidly detect absolute positions of a plurality of moving bodies on the ground side with a high degree of accuracy.
(3) It is possible to detect positions of moving bodies using a tracking table without reading IDs of the moving bodies.
(4) Since ends of detection areas of linear sensors are partially overlapped with each other, it is possible to detect the position of the moving body without any interruption.

The invention claimed is:

1. A moving body system detecting a position of moving bodies by linear sensors, the system including:
    the linear sensors each outputting a relative position based on an origin located at a predetermined position of each sensor, the linear sensors being arranged at least in two rows along a moving route of the moving bodies;
    at least two marks to be detected by the linear sensors, the marks being provided in each of the moving bodies;
    means for adding an absolute coordinate of the origin located at the predetermined position of each of the linear sensors to an output from said each of linear sensors to determine an absolute position for each of the moving bodies;
    means for storing data of an ID of each of the moving bodies and a current position of each of the moving bodies;
    means for retrieving a record for each of the moving bodies from data stored in the storing means, searching a moving body having a current position closest to output from the linear sensors, and updating the current position for the moving body based on the output from the linear sensors;
    means for determining a moving direction for each of the moving bodies based upon whether the output from the linear sensors increases or decreases; and
    means for determining whether a next linear sensor or a previous linear sensor along the moving route is used, based upon the moving direction, when switching linear sensors.

2. The moving system according to claim 1, detection areas of the linear sensors in at least two rows being overlapped with each other at a boundary between the detection areas.

3. A method of detecting a position of moving bodies, including the steps of:
    arranging a plurality of linear sensors each outputting a relative position based on an origin located at a predetermined position of each sensor with a limited detection area, at least in two rows along a moving route of the moving bodies;
    providing at least two marks to be detected by the linear sensors in each of the moving bodies;
    detecting the marks by linear sensors in one row and by linear sensors in the other row, alternately and without interruption;
    adding an absolute coordinate of the origin located at the predetermined position of each of the linear sensors to an output from said each of linear sensors to determine an absolute position for each of the moving bodies by a controller provided in a ground;

storing data of an ID for each of the moving bodies and a current position of each of the moving bodies;

retrieving a record for each of the moving bodies from data stored in the storing means, searching a moving body having a current position closest to output from the linear sensors, and updating the current position of the moving body based on the output from the linear sensors;

determining a moving direction for each of the moving bodies based upon whether the output from the linear sensors increases or decreases; and determining whether a next linear sensor or a previous linear sensor along the moving route is used, based upon the moving direction, when switching linear sensors.

* * * * *